(12) United States Patent
Nelson et al.

(10) Patent No.: US 6,370,813 B1
(45) Date of Patent: Apr. 16, 2002

(54) INSECT BAIT STATION AND RESERVOIR

(75) Inventors: Thomas D. Nelson, Maplewood; Keith D. Johnson, Woodbury, both of MN (US)

(73) Assignee: Ecolab Inc., St. Paul, MN (US)

(*) Notice: Subject to any disclaimer, the term of this patent is extended or adjusted under 35 U.S.C. 154(b) by 0 days.

(21) Appl. No.: 09/495,069

(22) Filed: Jan. 31, 2000

(51) Int. Cl.[7] .................................................. A01M 1/20
(52) U.S. Cl. ........................................... 43/131; 43/121
(58) Field of Search ....................... 43/121, 131, 132.1; 220/4.22, 4.23, 254, 672, 673, 675, 836, 837, 839

(56) References Cited

U.S. PATENT DOCUMENTS 140,954 A * 7/1873 Rubarth .......................... 43/121
602,410 A * 4/1898 Selvidge ........................ 43/121

(List continued on next page.)

FOREIGN PATENT DOCUMENTS

EP         0 395 954      4/1990
WO     WO 91/15951    10/1991

OTHER PUBLICATIONS

Brochure entitled "Meet Your Security Guard," Ecolab Inc., 1996 (2 pages).
Brochure entitled "Introducing Drax Liquidator," Waterbury Companies, Inc., 1998 (1 page).
Ad entitled "Perimeter Patrol System" from p. 20 of B & G Application Solutions catalog, Oct. 1999, B & G Equipment Co. (1 page).
Ad entitled "What Are Large Ant Colonies Saying About The Advance Ant Colony Elimination System?" from p. 57 of Pest Control Technology, Sep. 1999, Whitmire Micro-Gen Research Laboratories, Inc. (1 page).
Ad entitled "The fastest way to liquidate ants." from pp. 40–41 of Pest Control Technology, Mar. 1999, Waterbury Companies, Inc. (2 pages).

*Primary Examiner*—Darren W. Ark
(74) *Attorney, Agent, or Firm*—Mau & Krull, P.A.

(57) ABSTRACT

The present invention relates to a bait station comprising a base, a reservoir, a cover, and a latch. The base may be used in two different orientations and includes a first section and a second section. The first section has climbing assisting members and a cavity with a reservoir receiving area, and the second section has side climbing assisting members. The climbing assisting members and side climbing assisting members of the base provide a textured surface that enables insects to crawl into and out of the bait station more easily. The reservoir contains poisonous bait and may be placed in two different positions within the reservoir receiving area to accommodate the two different orientations in which the base may be used. The reservoir includes tapered sides with climbing assisting members. The climbing assisting members provide a textured surface that enables insects to crawl into and out of the reservoir more easily. The reservoir also includes an aperture proximate a corner of the reservoir, which provides an entrance into and out of the reservoir and reduces the rate of evaporation of the poisonous bait. The tapered sides of the reservoir also reduce the rate of evaporation of liquid bait because as the volume of the bait decreases, the surface area of the bait exposed to air flowing in and out of the reservoir is also decreased. Finally, the cover is configured and arranged to fit over the base, and the latch secures the cover to the base.

15 Claims, 7 Drawing Sheets

U.S. PATENT DOCUMENTS

| | | | | |
|---|---|---|---|---|
| 944,568 A | * | 12/1909 | Mercer | 43/121 |
| 995,207 A | * | 6/1911 | Watkins | 43/121 |
| 1,286,763 A | * | 12/1918 | Pfeiffer, Sr. | 43/131 |
| 1,599,408 A | * | 9/1926 | Cardinet | 43/131 |
| 1,960,464 A | * | 5/1934 | Thalheimer | 43/131 |
| 2,167,978 A | * | 8/1939 | Jennerich | 43/121 |
| 3,521,788 A | * | 7/1970 | Kandel et al. | 220/675 |
| 4,394,906 A | * | 7/1983 | Hollenbeck | 220/4.23 |
| 4,698,934 A | * | 10/1987 | Gonzalez et al. | 43/121 |
| 5,381,901 A | * | 1/1995 | Hundley | 220/675 |
| 5,528,854 A | | 6/1996 | Antonali et al. | 43/131 |
| 5,873,193 A | | 2/1999 | Jensen | 43/131 |
| 5,918,410 A | | 7/1999 | Knuppel | 43/131 |
| 5,926,999 A | * | 7/1999 | Vernon et al. | 43/121 |
| 5,943,816 A | | 8/1999 | Hyatt et al. | 43/131 |
| 5,943,817 A | | 8/1999 | Miller | 43/131 |
| 5,953,854 A | | 9/1999 | Hyatt | 43/131 |
| 5,960,585 A | | 10/1999 | Demarest et al. | 43/131 |
| 5,966,863 A | | 10/1999 | Payton et al. | 43/131 |

* cited by examiner

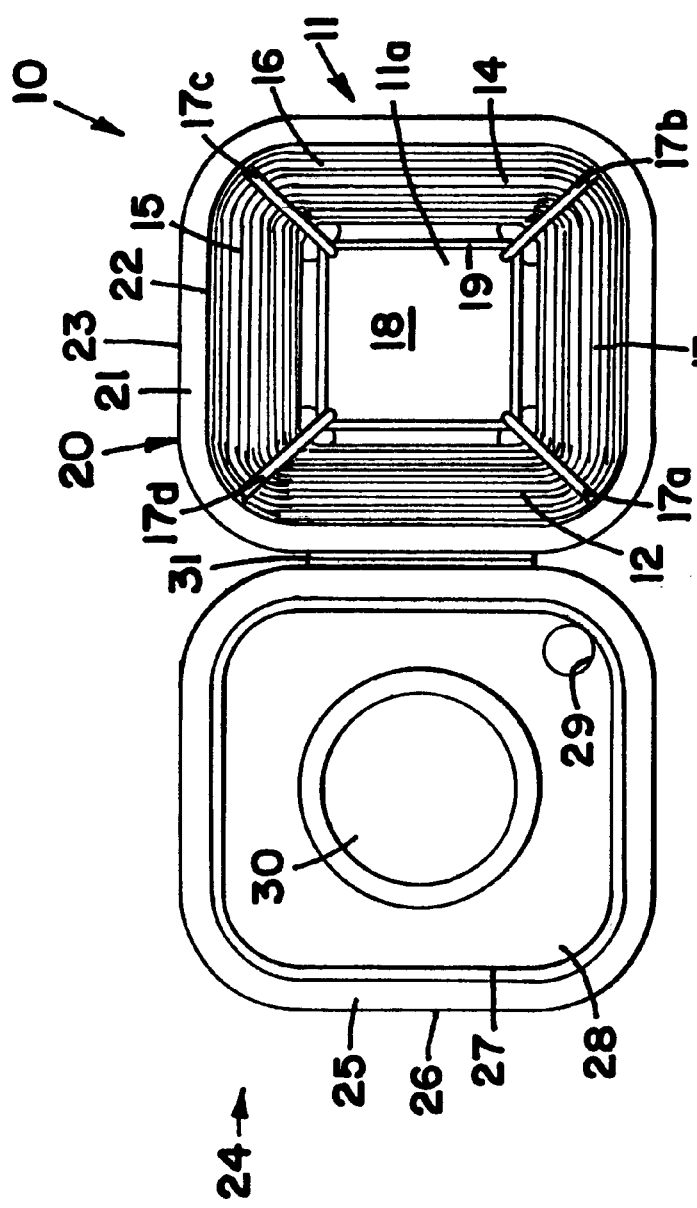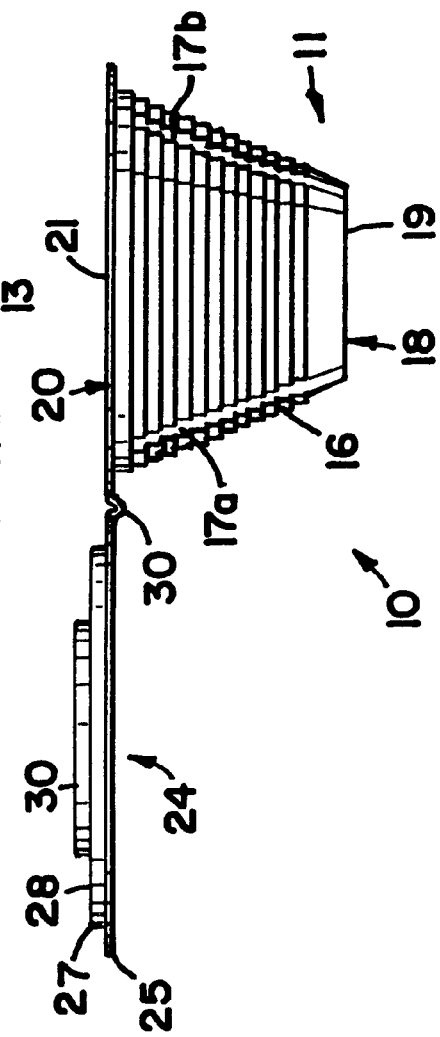

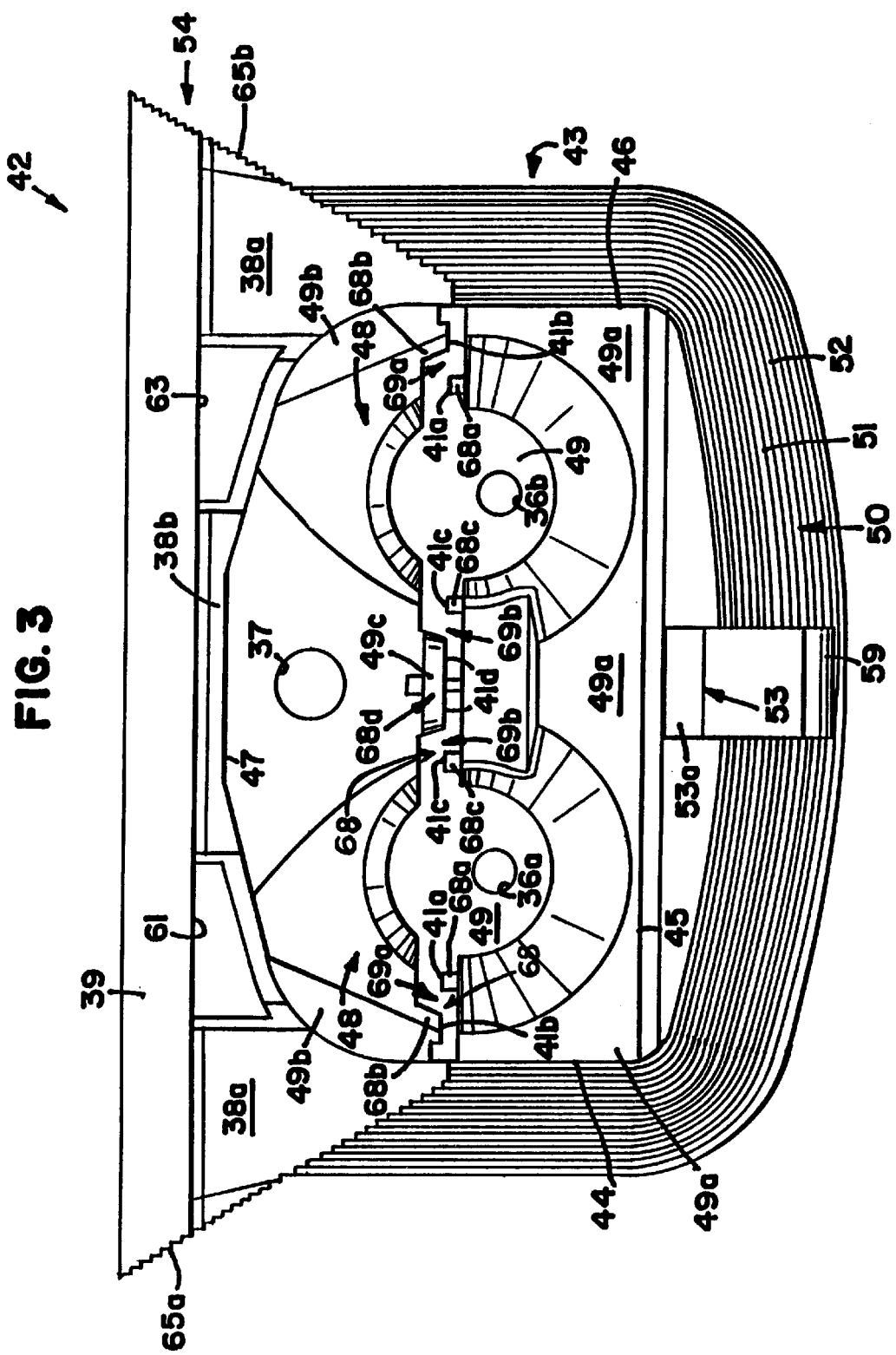

INSECT BAIT STATION AND RESERVOIR

BACKGROUND OF THE INVENTION

1. Field of the Invention

The present invention relates to a bait station including a bait reservoir, and more specifically, an insect bait station including an insect bait reservoir.

2. Description of the Prior Art

The present invention relates to bait stations and bait reservoirs. Although the preferred embodiment of this invention uses ants as an example, the preferred embodiment may easily accommodate other arthropods or may even be scaled up to accommodate small rodents.

Of the more than 10,000 species of ants in existence, fewer than 30 species commonly infest structures, but each of these pest ant species is dramatically different and presents widely varying challenges, making the ant, as a group, a highly challenging adversary. Different species of ants and even different ants within a species vary widely in many respects including size, color, shape, distribution, food preference, and nest locations. Despite these differences, there are some behavioral traits common to most ants, especially traits having to do with feeding and colonies. Ants generally feed on a variety of food sources and will forage wherever necessary to find it. In all species, it is the worker ants that venture out to forage for food and water for the entire colony. Worker ants leave the colony each day in search of food, and when food is found, the ant lays a scent trail from the food to the nest. Then, other ants follow this trail to collect food for the colony. The ants will either carry the particles back to the nest or ingest the food and regurgitate it upon return to the nest to feed other members of the colony, such as larvae and the queen who remain in the nest. While many species of ants will tolerate having only one queen in a colony, a few species will form multiple-queen colonies, thus making the colony more difficult to eliminate. This highly developed colonization system is a primary reason why ants are so successful and explains why they make such challenging foes.

In order to eradicate a colony, it is necessary to eliminate the reproductive queen, who does not leave the nest and is very well-protected by the workers. The worker ants seen foraging outside the nest for food form a minority of the colony population, and killing these ants has little impact on the colony. The most effective way to destroy insects such as ants is to lure the workers to poisonous bait, which is then taken back to the insects' home where more complete exposure occurs. Then, the other ants in the colony, including the queen, consume the bait and die, thus eliminating the colony. Exposure of the bait to outside elements, however, can reduce its shelf-life and/or effectiveness.

Various types of devices for destroying insects are known in the art. Such devices commonly used include insecticidal sprays, traps, and poisonous baits. In some devices, the insects are trapped in the device after entering by either mechanical means or by sticking to an adhesive substance. Once these devices are full, they are ineffective to trap additional insects. As discussed above, the most effective way to eradicate a colony is to use poisonous bait. In some devices containing poisonous bait, the bait can be easily spilled from the device, causing risk of exposure to children or small domestic animals. Poisonous bait used in such devices may be in various forms including liquid, granules, gel, and pellets. To remain effective, the bait should not be exposed to outside elements. In other devices, there are tunnels or ramps directing the insects to the center of the bait station where the poisonous bait is located, but not all types of ants can use such tunnels or ramps to reach the bait. Because of the varying characteristics of the many different ant species, it is difficult to design a bait station that can accommodate different species of ants and different types of insects.

In U.S. Pat. No. 5,918,410 to Knuppel, a baiting device includes a stem having a hollow upper end with a first opening and a second opening and a covered bait container mounted on the stem between the first opening and the second opening. The stem is hammered into the ground to secure the device. Insects enter the stem through the first opening and enter the container through the second opening of the stem.

U.S. Pat. No. 5,953,854 to Hyatt discloses a granular bait station having a tunnel entrance at the bottom leading to an interior bridged member, which then leads to a bait source contained within the interior of the bait station. The cover of the bait station also has an entrance leading to the interior bridged member.

U.S. Pat. No. 5,960,585 to Demarest et al. discloses a bait station for crawling insects. The bait station includes a base and a cover fastened to the base, and the base includes a bait cup with a bait cup wall. The cover includes a shell defining a walkway between the shell wall and the bait cup wall. The shell also includes a roof that spans the space encompassed by the shell wall, the roof being supportable by the side support. An antechamber is defined on one side by the side support and on another side by the shell wall, and the floor of the antechamber is continuous with the floor of the walkway. An antechamber door in the shell wall opens into the antechamber to admit targeted insects and is so located that straight line access through the antechamber door to the bait cup is restricted by the side support.

In the bait station of Payton et al., U.S. Pat. No. 5,966,863, a liquid bait station for ants has separate nested inner and outer container sections with the inner container forming a liquid bait reservoir. The inner container reservoir has a lid that is closed whenever the outer container is closed, and access to the reservoir of liquid bait by the ants is indirect via one or more container access ports leading to a compartment inside the outer container and then via separate reservoir access ports leading from the compartment to the reservoir. The reservoir access ports can be depressions in a raised portion in the inner surface of the outer container's cover or holes in the inner lid. Also, the ant bait station may be combined with a rodent bait station, provided there are separate internal compartments and separate access ports for the rodents and ants.

U.S. Pat. No. 5,873,193 to discloses a reusable and refillable insect bait station having base passageways to its interior bait reservoir, a removable top cap, and a lower ground engaging support stake member. The ground engaging stake member has upper protrusions that engage base notches to hold these two components together. The cap has a lower mating indent which engages a protruding member on the base to hold these components together in a snap fit relationship. When access to the base's reservoir is desired, the removable cap is pulled off by a tab and the bait is inserted. Both the cap and the base should be made of a flexible weather resistant material, such as rubber or soft plastic, to permit the firmer stake material and its protrusions to easily be inserted in a locking manner into the base.

U.S. Pat. No. 5,943,817 to Miller discloses a snail bait holder and pest trap having a removably attached cover seated on a vessel to form a bait chamber. An impervious replaceable tray is positioned in the bait chamber, and the tray has a receptacle containing a layer of liquid adhesive with bait material disposed on the layer of liquid adhesive. Vessel walls are cut away to form ramps and openings for pests to travel over the ramps through the openings and into the bait chamber. The tray containing the bait and liquid adhesive is packaged for placement in the bait chamber with a thin film disposed over the tray. Before the tray with the bait and liquid adhesive is placed in the bait chamber, the thin film is removed from the tray.

In the bait station of Hyatt et al., U.S. Pat. No. 5,943,816, an apparatus for liquid bait-toxicant delivery with feeding pores comprises a reservoir, a feeding disk with capillary feeding pores, a base that will seal the feeding pores when the station is closed; designed such that it can be opened or closed by several different arrangements; and a method of delivery of liquid bait-toxicant using capillary feeding pores in direct contact with liquid without using wicking material.

Finally, in U.S. Pat. No. 5,528,854 to Antonali et al., an insect bait assembly for retaining insect bait includes an elongate support body having spaced ends, an upper surface and a lower surface, and a reservoir monolithically formed with the support body. The reservoir has a peripheral wall extending upwardly from the upper surface of the support body and substantially surrounding and defining an interior cavity for holding the volume of insect bait. The support body has a reinforced region configured for strengthening the support body and resisting bending of the support body proximate the reservoir.

Of these prior art patents, none discloses a base having capability of being arranged in two different orientations, climbing assisting members, an elevated reservoir receiving area within the base for bait in any form, a reservoir having tapered walls and a hole proximate the corner between two tapered walls, and an ant and weather resistant cover.

SUMMARY OF THE INVENTION

The present invention relates to a bait station including a bait reservoir, and more specifically, an insect bait station including an insect bait reservoir. In a preferred embodiment reservoir, the reservoir comprises a chamber including a top having an opening, a bottom, and walls having an inside surface interconnecting the top and the bottom. The walls and the bottom define a cavity within the chamber. The inside surface of the walls includes climbing assisting members that assist insects in crawling on the inside surface of the walls.

In a preferred embodiment bait station for use with bait, the bait station comprises a base and an outer surface. The base has a cavity configured and arranged to receive the bait. The outer surface extends from the base and forms a ramp proximate the bait. The outer surface includes climbing assisting members to assist insects in crawling into the base.

In another preferred embodiment bait station, the bait station comprises a bait, a base, a first orientation, a second orientation, a cavity, an outer surface, a first set of side climbing assisting members, a second set of side climbing assisting members, and a cover. The base includes a first section and a second section forming an L-shape, and the base is capable of being used in two different orientations. The second section includes a first side, a second side, a third side, and a fourth side. In the first orientation, the first section is in a horizontal position and the second section is in a vertical position. In the second orientation, the second section is in a horizontal position and the first section is in a vertical position. The cavity is located within the first section and is configured and arranged to receive the bait when the base is in either the first orientation or the second orientation. The outer surface extends from the first section and forms a ramp proximate the bait, and the outer surface includes climbing assisting members to assist insects in crawling into the base. The first set of side climbing assisting members and the second set of side climbing assisting members are also proximate the bait and assist insects in crawling into the base. The first set of side climbing assisting members is proximate the second side of the second section. The second set of side climbing assisting members is proximate the third side of the second section.

BRIEF DESCRIPTION OF THE DRAWINGS

FIG. 1 is a top view of a reservoir constructed according to the principles of the present invention.

FIG. 2 is a side view of the reservoir shown in FIG. 1.

FIG. 3 is a top view of a base of a bait station according to the principles of the present invention.

DETAILED DESCRIPTION OF THE PREFERRED EMBODIMENT

Figure 4:
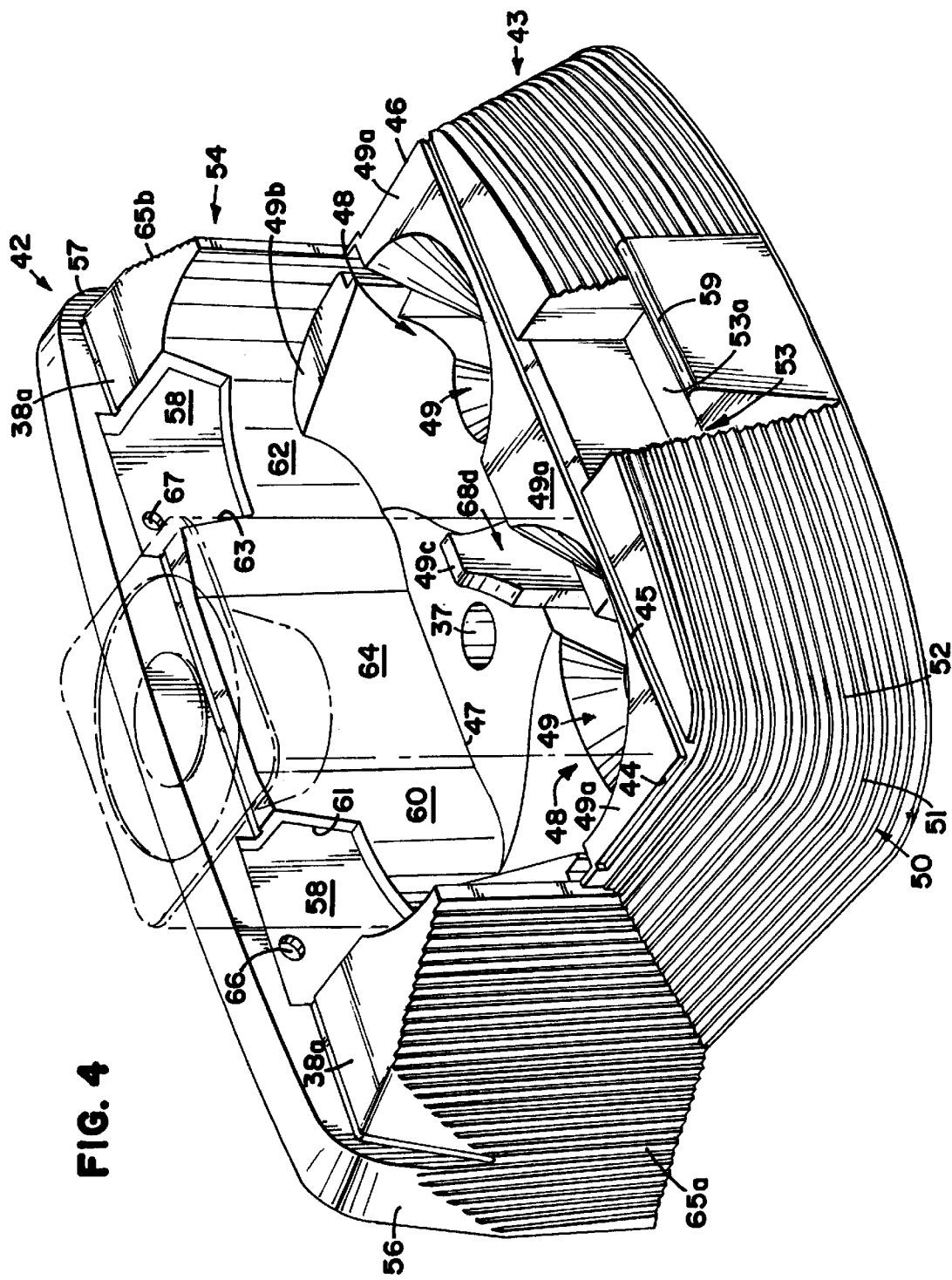
FIG. 4 is a perspective view of the base of the bait station shown in FIG. 3 in a first orientation and a perspective view of the reservoir shown in FIG. 1.

A preferred embodiment reservoir and a preferred embodiment bait station are constructed according to the principles of the present invention and are designated by the numbers 10 and 40, respectively.

FIG. 1 is a top view of a preferred embodiment reservoir 10 and FIG. 2 is a side view of a preferred embodiment reservoir 10. Reservoir 10 includes a chamber 11 and a lid 24. Chamber 11 comprises a first tapered wall 12, a second tapered wall 13, a third tapered wall 14, a fourth tapered wall 15, a bottom 18, and a top 20. Tapered walls 12–15 and bottom 18 define cavity 11a. Top 20 has an opening to allow access to cavity 11a. First tapered wall 12 is connected on one side to one side of second tapered wall 13, thus forming corner 17a at an approximately 90° angle. Second tapered wall 13 is connected on its opposite side to one side of third tapered wall 14, thus forming corner 17b at an approximately 90° angle. Third tapered wall 14 is connected on its opposite side to one side of fourth tapered wall 15, thus forming corner 17c at an approximately 90° angle. Finally, fourth tapered wall 15 is connected on its opposite side to the opposite side of first tapered wall 12, thus forming corner 17d at an approximately 90° angle. Corners 17a–d can be traditional corners, edges, curves, troughs, ridges or the like. In the preferred embodiment, corners 17a–d are troughs within cavity 11a of chamber 11 to best assist the insects in crawling into and out of chamber 11.

Bottom 18 is defined by perimeter 19, which engages the bottom sides of tapered walls 12–15, forming an angle of 90° or greater with bottom 18. The preferred embodiment chamber 11 has tapered walls 12–15 forming a 90–135° angle with bottom 18, which aids the insects in climbing up and down chamber 11, and bottom 18 and tapered walls 12–15 are approximately 1/16 inch thick. Also, the preferred embodiment cavity 11a of chamber 11 has a volume of approximately 15–50 milliliters. However, it is understood that the volume of cavity 11a may be reduced or increased to accommodate use by smaller or larger arthropods. In addition, tapered walls 12–15 help reduce the rate of evaporation of a liquid bait contained within cavity 11a of chamber 11. The rate of evaporation of the liquid bait is reduced because as the volume of the bait decreases, the surface area of the top of the bait is also decreased, thus reducing the amount of bait exposed to air flowing in and out of cavity 11a and reducing the rate of evaporation. Additional ways in which reservoir 10 reduces the rate of evaporation of the bait are discussed below.

Tapered walls 12–15 and corners 17a–d include inside surfaces and outside surfaces having climbing assisting members 16, which provide a surface on which the insects will not easily slip off and therefore aids the insects in climbing up and down chamber 11. Insects must be able to crawl easily out of chamber 11 in order to increase the amount of exposure of the poisonous bait contained within cavity 11a by bringing the poisonous bait back to their nests, and the insects cannot do this if they are somehow trapped within chamber 11. With a liquid bait in particular, if insects cannot exit chamber 11 easily, there is an increased risk that the insects will drown in the bait in cavity 11a and not bring the poisonous bait back to their nests. Because insects tend to prefer crawling in corners, climbing assisting members 16 in corners 17a–d are of great assistance to the insects. This is especially true of the preferred embodiment reservoir 10 because corners 17a–d are troughs within cavity 11a, and the troughs guide the insects in and out of chamber 11. Climbing assisting members 16 are preferably a textured surface such as stairs having a rise approximately 1/64–1/4 inch and a run approximately 1/64–1/4 inch or any textured surface having a depth of at least 0.002 inch. In the preferred embodiment reservoir 10, climbing assisting members 16 are stairs having a rise and a run, the rise being approximately 1/16 inch long and the run being approximately 1/32 inch long, however, a textured surface as described would be sufficient to aid insects in crawling into and out of reservoir 10.

Top 20 of chamber 11 includes flange 21 comprising inside edge 22 and outside edge 23. Inside edge 22 engages the top sides of tapered walls 12–15 and forms an opening into cavity 11a of chamber 11. As discussed above, tapered walls 12–15 are at a 90–135° angle with bottom 18, and therefore top 20 is the same size or larger in size than bottom 18.

Lid 24 includes rim 25, seal 27, middle portion 28, and center portion 30. Rim 25 includes edge 26, and one side of edge 26 of lid 24 and outside edge 23 of top 20 proximate first tapered wall 12 of chamber 11 are interconnected to form hinge 31. Middle portion 28 includes aperture 29, and aperture 29 is preferably located proximate corner 17a when lid 24 is fastened on chamber 11. Because insects tend to prefer crawling in corners, having climbing assisting members 16 in corners 17a–d and having aperture 29 proximate a corner 17a–d encourages and assists the insects in crawling into and out of chamber 11, thus increasing the amount of exposure of the poisonous bait to the rest of the colony.

When reservoir 10 is assembled, lid 24 snaps onto top 20 of chamber 11, and seal 27 fits along the inside edge 22 of flange 21 to form a relatively tight fit of lid 24 and top 20 of chamber 11. The relatively tight fit ensures that insects cannot enter chamber 11 by any other means than through aperture 29 and that air flow into and out of chamber 11 is limited to flowing only through aperture 29, thus reducing the rate of evaporation of the poisonous liquid bait inside chamber 11. Therefore, to control the rate of evaporation of a liquid bait over time, aperture 29 should be only as large as necessary to allow insects access to the bait within chamber 11. In a preferred embodiment reservoir 10, aperture 29 has an approximately 1/8–3/8 inch diameter. With liquid bait in particular, it is important to limit the rate of evaporation because the bait may skin over and prevent the insects from having access to the bait. Also, if the bait skins over, the bait may come out of solution, thus reducing the consistency of the solution and potentially reducing exposure to the insects. Therefore, both the size of aperture 29 and tapered walls 12–15 limit the rate of evaporation of the bait and maximize exposure to the insects. However, for extreme ant infestation conditions, lid 24 may be removed completely from reservoir 10 to increase access to the bait contained within cavity 11a of chamber 11. This would ensure that several ants could enter and exit chamber 11 at the same time.

Reservoir 10 contains bait within cavity 11a, which is not shown. As discussed above, the most effective way to eradicate an insect colony is to use poisonous bait such as TERRO®, but it is recognized that any bait could be used inside reservoir 10. Baits are typically palatable and contain some type of toxicant or insecticide. The bait lures the insects to the reservoir, and then the insects carry the bait back to their nests. The bait may be in various forms including liquid, granules, gel, or pellets. To remain effective, the bait should not be exposed to outside elements, and lid 24 effectively limits the exposure because the only way in which outside elements may enter chamber 11 is through aperture 29. Reducing exposure to outside elements is especially important for granular bait because exposure to water could reduce its effectiveness. Therefore, as discussed above, aperture 29 provides an entrance for insects, reduces the rate of evaporation of the poisonous bait contained inside reservoir 10, and reduces the risk of exposure of the poisonous bait to outside elements or even spillage.

In the preferred embodiment, reservoir 10 is preferably molded as a single piece from polystyrene. It is understood, however, that reservoir 10 may be molded from any suitable material such as plastic, glass, or metal. It is also understood that reservoir 10 may be constructed in various shapes besides generally rectangular as in the preferred embodiment. Other possible shapes of reservoir 10 include generally square, spherical, conical, or tubular. Reservoir 10 may be used alone or in combination with bait station 40. When reservoir 10 is used alone, reservoir 10 may be used in two different positions, an upright position and a side position. In the upright position, chamber 11 rests on bottom 18. In the side position, chamber 11 rests on perimeter 19 of bottom 18 and flange 21 of top 20. Using reservoir 10 in combination with bait station 40 is discussed below.

Figure 5:
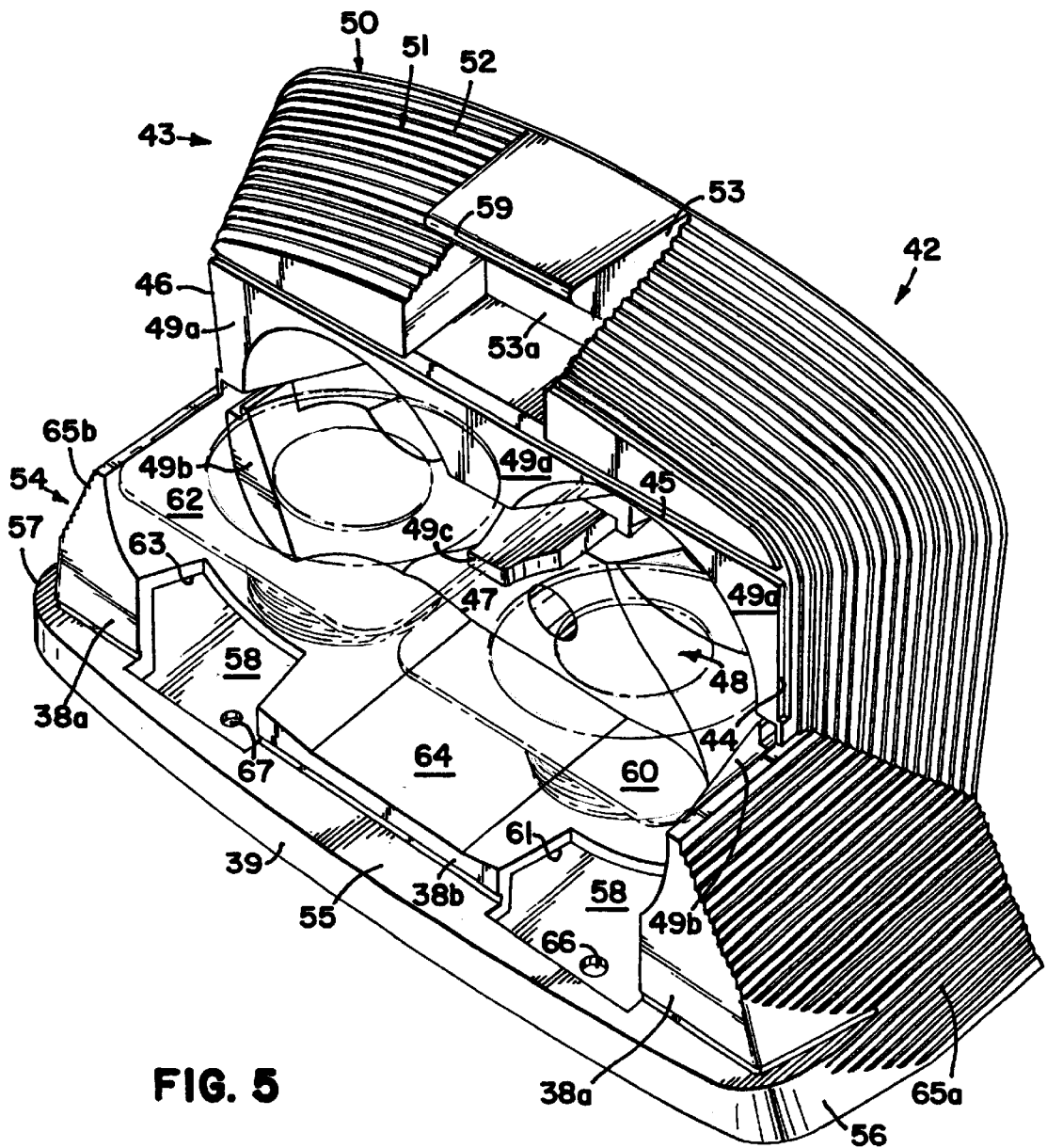
FIG. 5 is a perspective view of the base of the bait station shown in FIG. 3 in a second orientation and a perspective view of the reservoir shown in FIG. 1.

FIG. 3 is a top view of a preferred embodiment base 42 of a bait station 40 and FIGS. 4 and 5 are perspective views of a preferred embodiment base 42 of a bait station 40 in two different orientations. FIG. 4 shows a first orientation of base 42 and FIG. 5 shows a second orientation of base 42. With reference to FIGS. 3–5, base 42 includes first section 43 and second section 54. First section 43 includes first edge 44, second edge 45, third edge 46, fourth edge 47, cavity 48, latch securing member 53, and lip 59. Outer surface 50 surrounds first edge 44, second edge 45, and third edge 46 and forms a ramp 51 having climbing assisting members 52. Climbing assisting members 52 assist the insects in crawling into bait station 40 by providing a surface on which the insects will not slip off easily. Climbing assisting members 52 are preferably a textured surface such as stairs having a rise approximately 1/64–1/4 inch and a run approximately 1/64–1/4 inch or any textured surface having a depth of at least 0.002 inch. In the preferred embodiment, climbing assisting members 52 are stairs having a rise and a run, the rise being approximately 1/16 inch long and the run being approximately 1/32 inch long, however, a textured surface as described would be sufficient to aid insects in crawling up and down ramp 51 to gain access to reservoir 10 contained within cavity 48. Outer surface 50 is proximate reservoir receiving area 49. Cavity 48 includes reservoir receiving area 49, which is configured and arranged to receive reservoir 10 in different positions. In the preferred embodiment, cavity 48 and reservoir receiving area 49 are configured and arranged to accommodate two reservoirs 10 in two different positions, and the reservoir receiving area 49 is at a height greater than or equal to the height of the reservoir 10 contained within reservoir receiving area 49. While the preferred embodiment shows the use of two reservoirs 10 in two different positions within cavity 48, it is understood that the present invention would also include a single reservoir 10 in different positions within cavity 48 or a single reservoir 10 in a single position within cavity 48. It is also understood that multiple reservoirs 10 may be used in a single position within cavity 48 or in different positions within cavity 48. Reservoir receiving area 49 of first section 43 includes first opening 36a and second opening 36b, which provide drainage for first section 43 should moisture or water accumulate in cavity 48. Providing drainage is important because it prevents cavity 48 from filling with moisture or water and damaging the bait contained within bait station 40. First opening 36a is located in between slot 69a and slot 69b proximate first edge 44. Second opening 36b is located in between slot 69a and slot 69b proximate third edge 46.

In the first position, chamber 11 of reservoir 10 is simply set inside cavity 48 and flange 21 of reservoir 10 simply rests on top of reservoir receiving area 49. Reservoir receiving area 49 includes first shelf 49a, second shelf 49b, and central shelf 49c. A first shelf 49a extends proximate the junction of first edge 44 and second edge 45 of first section 43, across second edge 45, and proximate the junction of second edge 45 and third edge 46 of first section 43. A second shelf 49b extends proximate the junction of first edge 44 and fourth edge 47 of first section 43 and another second shelf 49b extends proximate the junction of third edge 46 and fourth edge 47 of first section 43. Central shelf 49c is proximate the center of first section 43 within cavity 48. Shelves 49a–c are on the same plane and are configured and arranged to support flange 21. In the preferred embodiment base 42, two reservoirs 10 may be placed within reservoir receiving area 49 as described.

In the second position, chamber 11 of reservoir 10 is simply slid into place within cavity 48 and reservoir receiving member 68 simply supports flange 21 of reservoir 10. Reservoir receiving member 68 includes first side ledge 68a, second side ledge 68b, first central ledge 68c, and second central ledge 68d. Ledges 68a and 68c are on the same plane, and ledges 68b and 68d are on the same plane. First side ledge 68a and second side ledge 68b form slot 69a and are proximate the junction of first edge 44 and the top of side climbing assisting members 65a. Another first side ledge 68a and another second side ledge 68b form another slot 69a and are proximate the junction of third edge 46 and the top of side climbing assisting members 65b. First central ledge 68c and second central ledge 68d form slot 69b and are proximate the center of first section 43 within cavity 48. Opposite sides of outside edge 23 of flange 21 rest within slots 69a and 69b. First side ledge 68a includes surface 41a, which supports the top of rim 25 on one side of reservoir 10. Second side ledge 68b includes surface 41b, which supports the bottom of flange 21 on the same side of reservoir 10 that is supported by surface 41a. First central ledge 68c includes surface 41c, which supports the top of rim 25 on the opposite side of reservoir 10 that is supported by surface 41a. Second central ledge 68d includes surface 41d, which supports the bottom of flange 21 on the same side of reservoir 10 that is supported by surface 41c. In the preferred embodiment base 42, two reservoirs 10 may be placed within reservoir receiving area 49 as described.

In either position within cavity 48, reservoir 10 is at an elevated position with respect to the floor to ensure that the poisonous bait contained inside reservoir 10 is protected from various conditions such as exposure to weather. To remain effective, the bait should not be exposed to outside elements and the elevated position of reservoir 10 is one way in which bait station 40 protects the bait.

Figure 8:
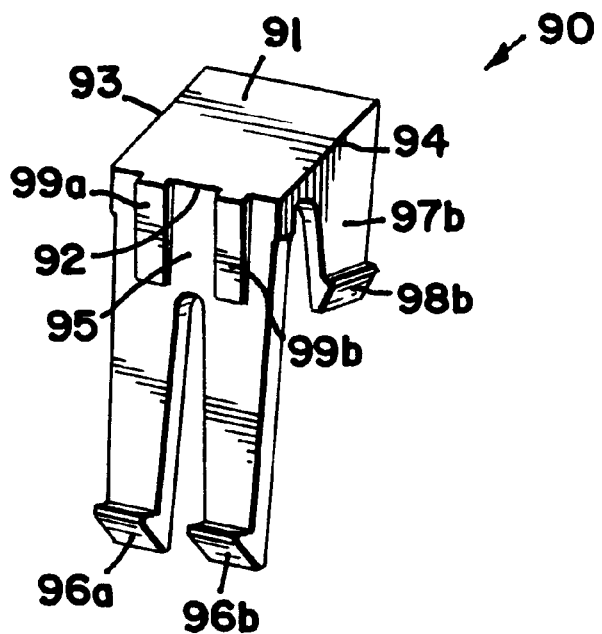
FIG. 8 is a front perspective view of a latch constructed according to the principles of the present invention.
Figure 9:
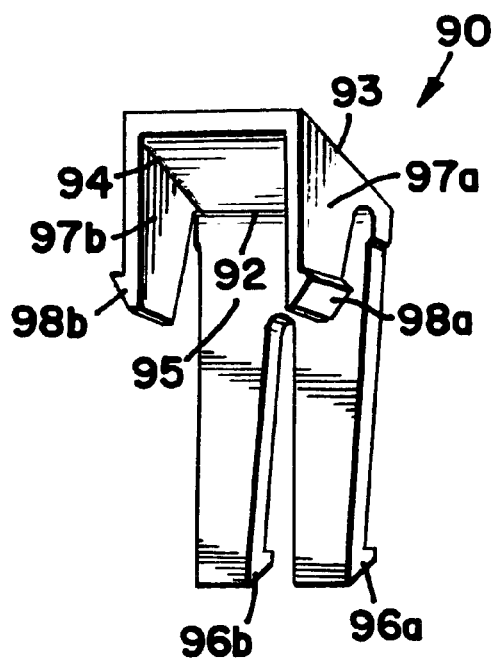
FIG. 9 is a rear perspective view of the latch shown in FIG. 8.

Opening 53a and latch securing member 53 of base 42 are configured and arranged to receive and secure forked stem 95, first catch 96a, and second catch 96b of latch 90, shown in FIGS. 8 and 9, thereby securing cover 70 to base 42. Opening 53a is aligned with first slot 73a and second slot 73b of cover 70, shown in FIG. 6, when bait station 40 is assembled. How latch 90 is secured is discussed in greater detail below. On base 42, lip 59 is proximate the top of latch securing member 53 and is configured and arranged to engage stabilizing tabs 76 of cover 70, shown in FIG. 6, thereby securing the point of contact between sloping front portion 79 of cover 70 and lip 59 of base 42 and preventing cover 70 from sliding back and forth on base 42. It is understood any suitable stabilizing mechanism may be utilized.

Second section 54 includes top 39, first side 55, second side 56, third side 57, and fourth side 58. Top 39 interconnects the tops of first side 55 and fourth side 58. Second side 56 interconnects the sides of first side 55 and fourth side 58. Third side 57 interconnects the opposite sides of first side 55 and fourth side 58. Proximate the junction of first section 43 and second section 54 are side climbing assisting members 65. Side climbing assisting members 65 include a first set of side climbing assisting members 65a and a second set of side climbing assisting members 65b, both of which are proximate reservoir receiving area 49 of first section 43. The first set of side climbing assisting members 65a is proximate first edge 44 of first section 43 and second side 56 of second section 54. The second set of side climbing assisting members 65b is proximate third edge 46 of first section 43 and third side 57 of second section 54. Proximate the center of first side 55 is center support 38b and proximate side climbing assisting members 65 and first side 55 are side supports 38a. Side supports 38a and center support 38b are on the same plane and support back 81 of cover 70, shown in FIG. 6, when bait station 40 is assembled.

Second section 54 also includes first segment 60 having first passage 61, second segment 62 having second passage 63, and third segment 64. Third segment 64 is parallel with first side 55 and fourth side 58 while first segment 60 and second segment 62 are angled to provide additional support for the top ends of the first set of side climbing assisting members 65a and the second set of side climbing assisting members 65b, which are located proximate both second side 56 and third side 57, respectively, as discussed above. Fourth side 58 includes first opening 66 and second opening 67. First passage 61 and second passage 63 of first side 55 provide access to first opening 66 and second opening 67 of fourth side 58, respectively, wherein securing objects such as stakes, screws, or nails may be placed through first opening 66 and second opening 67 to secure base 42 to either the floor or the wall, depending upon which orientation of base 42 is used. An additional way to secure base 42 to either the floor or the wall is to insert a securing object such as a stake, a screw, or a nail through opening 37, which is proximate fourth edge 47 of first section 43. It is understood that the term floor includes any horizontal surface and that the term wall includes any vertical surface.

There are two different orientations of base 42. The first orientation, as shown in FIG. 4, is where first section 43 is resting on the floor and second section 54 is placed against the wall. In the first orientation of base 42, reservoir 10 is simply set inside cavity 48 and flange 21 of reservoir 10 rests on top of reservoir receiving area 49 as discussed above. When base 42 is in the first orientation, reservoir 10 is in the first position. The insects enter bait station 40 by crawling up climbing assisting members 52 from the floor or across side climbing assisting members 65 from the wall into cavity 48. The second orientation, as shown in FIG. 5, is where second section 54 is resting on the floor and first section 43 is placed against the wall. In the second orientation of base 42, reservoir 10 is slid into place within cavity 48 and flange 21 rests within slots 69a and 69b as discussed above. When base 42 is in the second orientation, reservoir 10 is in the second position. The insects enter bait station 40 by crawling on side climbing assisting members 65 from the floor and/or by crawling on climbing assisting members 52 from the wall. Once the insects have entered cavity 48 in either orientation, the insects then crawl on lid 24 of reservoir 10, into aperture 29, and on climbing assisting members 16 to gain access to the poisonous bait, which they then bring back to their nests to feed the other members of their colony.

Figure 6:
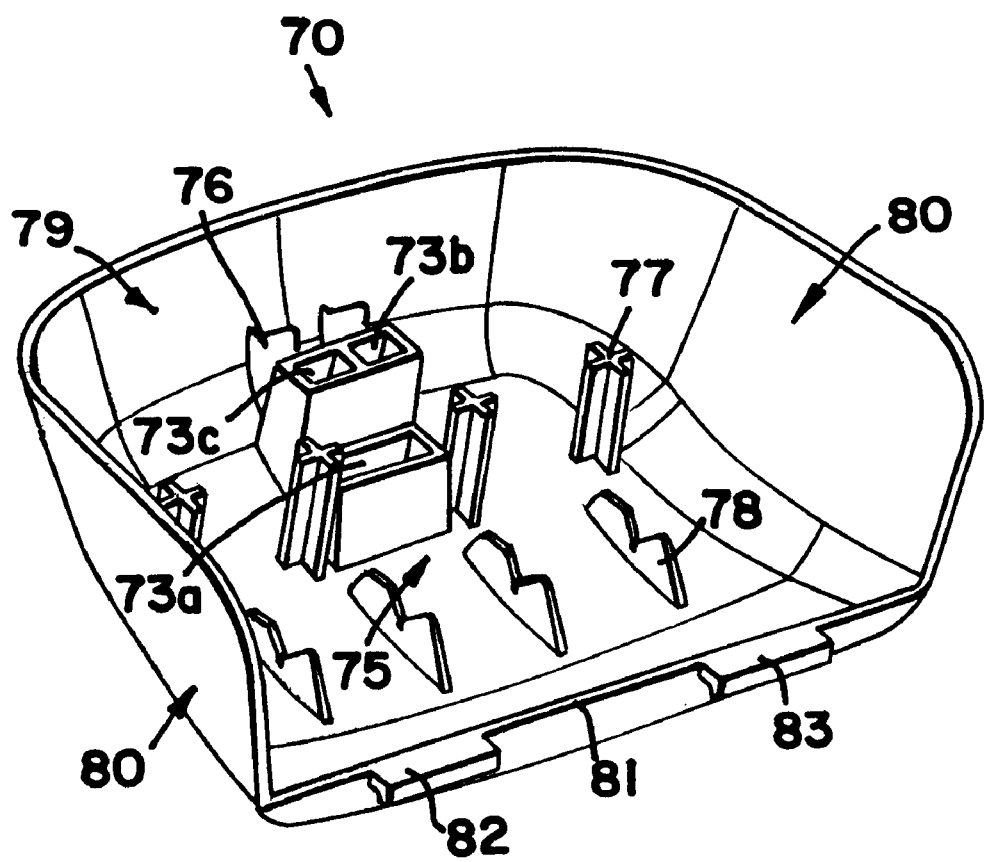
FIG. 6 is a perspective bottom view of a cover of a bait station constructed according to the principles of the present invention.

FIG. 6 is a perspective bottom view of a preferred embodiment cover 70 of a bait station 40. FIG. 6 shows latch receiving member 73, bottom surface 75, sloping front portion 79, sloping side portions 80, and back 81 of cover 70. Latch receiving member 73 of cover 70 includes first slot 73a, second slot 73b, and third slot 73c. How slots 73a–c interact with latch 90 is discussed in greater detail below. Bottom surface 75 includes stabilizing tabs 76, first reservoir securing member 77, and second reservoir securing member 78. Stabilizing tabs 76 are configured and arranged to rest upon lip 59 of base 42, thus securing the point of contact between sloping front portion 79 of cover 70 and lip 59 of base 42 and preventing cover 70 from sliding back and forth on base 42. First reservoir securing member 77 holds reservoir 10 in place within reservoir receiving area 49 when base 42 is in its first orientation and reservoir 10 is in its first position. Second reservoir securing member 78 holds reservoir 10 in place within reservoir receiving area 49 when base 42 is in its second orientation and reservoir 10 is in its second position. Reservoir securing member 77 and 78 engage flange 21 of reservoir 10 so as to prevent reservoir 10 from sliding around within cavity 48. First reservoir securing member 77 rests on top of flange 21 when reservoir 10 is in the first position and base 42 is in the first orientation. Second reservoir securing member 78 are configured and arranged to engage outside edge 23 of flange 21 when reservoir 10 is in the second position and base 42 is in the second orientation. Therefore, base 42 and cover 70 work together to hold reservoir 10 in place within bait station 40.

Back 81 of cover 70 includes first hinge 82 and second hinge 83. First hinge 82 and second hinge 83 are configured and arranged to be inserted into first passage 61 and second passage 63 of base 42, respectively, to help secure cover 70 to base 42. Once cover 70 is secured on base 42, latch 90 locks bait station 40 together. Latch 90 is discussed in greater detail below.

Figure 7:
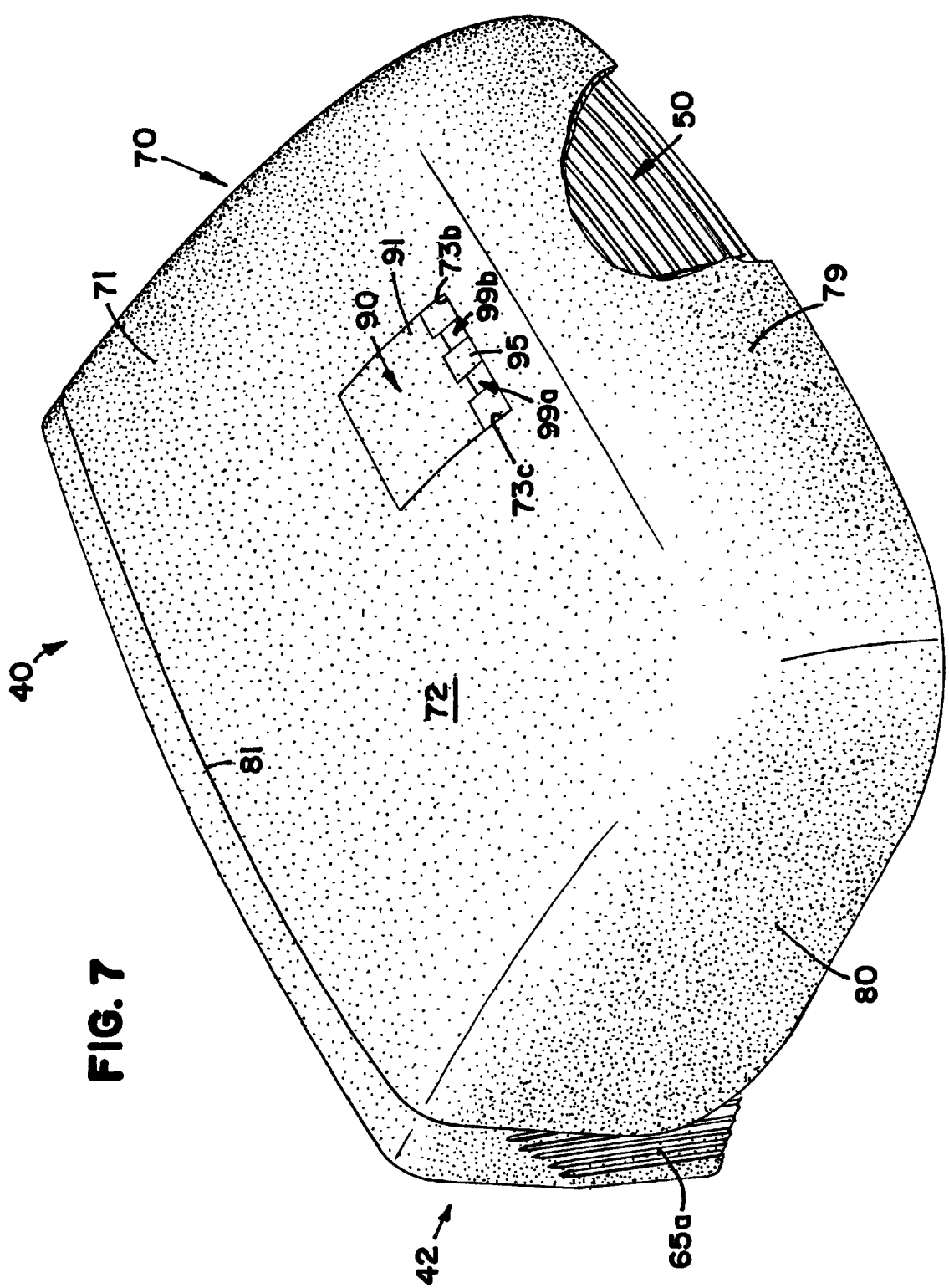
FIG. 7 is a perspective view of a bait station assembled constructed according to the principles of the present invention.

FIG. 7 is a perspective view of a preferred embodiment bait station 40 assembled. As discussed above, bait station 40 can be positioned in two different orientations. Bait station 40 includes reservoir 10, base 42, cover 70, and latch 90. Reservoir 10, base 42, and cover 70 were discussed in greater detail above. When bait station 40 is assembled, cover 70 provides several functions. First, cover 70 provides protection from various conditions such as weather or tampering by small children and animals. Should the bait station be placed in an outside location and it rains, the water will run off of top surface 71 without entering base 42 and reservoir 10. The elevated placement of reservoir 10 within reservoir receiving area 49 and the drainage provided by first opening 36a and second opening 36b coupled with cover 70 provides adequate protection from various conditions. Second, cover 70 provides an aesthetically pleasing appearance of bait station 40 because the insects cannot crawl on top of cover 70 easily, and therefore, the insects are not seen crawling all over bait station 40. The insects may not easily crawl on top of cover 70 because smooth outer surface 72, sloping front portion 79, and sloping side portions 80 lack any defined texture and are not at suitable angles on which insects can easily crawl. Therefore, cover 70 lacks any texture that would provide traction and enable the insects to crawl on its surface. The insects may only easily crawl on climbing assisting members 52 and side climbing assisting members 65, which are effectively covered by the overbite of cover 70 and are thus hidden from view.

FIGS. 8 and 9 show latch 90 in greater detail. Latch 90 locks base 42 and cover 70 together, which makes bait station 40 tamper-resistant and weatherproof. Latch 90 includes top portion 91 having front 92, first side 93, and second side 94. Forked stem 95 interconnects front 92 with first catch 96a and second catch 96b. Forked stem 95 includes guide 99a and guide 99b proximate front 92, which provide guidance for a key (not shown) when unlocking bait station 40. First stem 97a interconnects first side 93 with first side catch 98a, and second stem 97b interconnects second side 94 with second side catch 98b. In the preferred embodiment, latch 90 is molded as a separate piece for ease of manufacture and to lower the cost of manufacture, however, latch 90 could be molded together with cover 70. Locking bait station 40 is relatively easy. First, latch 90 is inserted into cover 70. Once latch 90 is inserted into cover 70, latch 90 may be treated as one piece with cover 70 because it does not have to be removed. Second slot 73b and third slot 73c of cover 70 are configured and arranged to receive forked stem 95, first catch 96a, and second catch 96b of latch 90. When first catch 96a and second catch 96b are inserted into slot 73b and slot 73c, respectively, latch 90 is pushed into cover 70 until first side catch 98a and second side catch 98b are positioned in first slot 73a and top portion 91 is aligned with top surface 71 of cover 70. Catches 98a and 98b are configured and arranged to snap onto the outside edges of slot 73a, and this locks latch 90 to cover 70. Rather than having catches 98a and 98b, it is understood that latch 90 may also be screwed onto cover 70, molded to cover 70, or attached by any suitable mechanism known in the art. Once cover 70 is secured on base 42 as discussed in greater detail above, forked stem 95 of latch 90 is inserted into opening 53a where first catch 96a and second catch 96b snap onto latch securing member 53 of base 42, locking cover 70 onto base 42. Latch 90 can be removed from base 42 with a key (not shown), which is inserted into second slot 73b and third slot 73c, and the key pushes forked stem 95 which in turn pushes first catch 96a and second catch 96b away from latch securing member 53, thus enabling latch 90 to be pulled out of base 42. Although this is the latching mechanism used in the preferred embodiment, it is understood any suitable latching mechanism may be utilized.

The above specification, examples and data provide a complete description of the manufacture and use of the composition of the invention. Since many embodiments of the invention can be made without departing from the spirit and scope of the invention, the invention resides in the claims hereinafter appended.

We claim:

1. An insect bait station, comprising:
   a. a bait;
   b. a base having a first section and a second section, said second section including a first side, a second side, a third side, and a fourth side, said first section and said second section forming an L-shape;
   c. a first orientation of said base with said first section being in a horizontal position and said second section being in a vertical position;
   d. a second orientation of said base with said first section being in a vertical position and said second section being in a horizontal position;
   e. a cavity within said first section, wherein said cavity is configured and arranged to receive the bait when said base is in said first orientation, and said cavity is configured and arranged to receive the bait when said base is in said second orientation;
   f. an outer surface extending from said first section, wherein said outer surface forms a ramp proximate said bait and said outer surface includes climbing assisting members;
   g. a first set of side climbing assisting members and a second set of side climbing assisting members, said first set of side climbing assisting members being proximate said bait and said second side of said second section, and said second set of side climbing assisting members being proximate said bait and said third side of said second section; and
   h. a cover connected to said second section.

2. The insect bait station of claim 1, further comprising a reservoir containing said bait.

3. The insect bait station of claim 2, wherein said first section contains a reservoir receiving area within said cavity.

4. The insect bait station of claim 3, wherein said reservoir has a height and said reservoir receiving area has a height greater than or equal to the height of said reservoir.

5. The insect bait station of claim 4, wherein said cover extends over said first section and extends over a major portion of said outer surface.

6. The insect bait station of claim 5, wherein said reservoir receiving area and said cover make said bait station weatherproof.

7. The insect bait station of claim 6, further comprising a latch receiving member on said cover, a latch securing member on said base being aligned with said latch receiving member, and a latch, said latch including a front having a front stem with a base catch, said latch also including a first side having a first side stem with a first cover catch, said first cover catch being configured and arranged to secure said cover by locking onto said latch receiving member of said cover, and said base catch being configured and arranged to secure said base by locking onto said latch securing member, thereby locking said cover to said base.

8. The insect bait station of claim 7, further comprising a second side having a second side stem with a second cover catch, said first cover catch and said second cover catch being configured and arranged to secure said cover by locking onto said latch receiving member.

9. The insect bait station of claim 2, wherein said reservoir has an inner surface, said inner surface including climbing assisting members, said climbing assisting members being configured and arranged to assist insects in crawling into and out of said reservoir.

10. The insect bait station of claim 2, wherein said cover further comprises an inner surface having a reservoir securing member.

11. The insect bait station of claim 1, wherein said climbing assisting members and said side climbing assisting members are a textured surface.

12. The insect bait station of claim 11, wherein said textured surface comprises stairs.

13. The insect bait station of claim 12, wherein said stairs have a rise and a run, and said rise is approximately $\frac{1}{64}$ to $\frac{1}{4}$ inch and said run is approximately $\frac{1}{64}$ to $\frac{1}{4}$ inch.

14. The insect bait station of claim 12, wherein said stairs have a rise and a run, and said rise is approximately $\frac{1}{16}$ inch and said run is approximately $\frac{1}{32}$ inch.

15. The insect bait station of claim 1, wherein said cover has a smooth outer surface and a dome-like shape providing a surface on which insects cannot crawl easily.

* * * * *